(12) United States Patent
Youm

(10) Patent No.: US 8,802,283 B2
(45) Date of Patent: Aug. 12, 2014

(54) FABRICATING METHOD OF SECONDARY BATTERY

(75) Inventor: Chul Youm, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/553,528

(22) Filed: Jul. 19, 2012

(65) Prior Publication Data

US 2013/0189569 A1 Jul. 25, 2013

Related U.S. Application Data

(60) Provisional application No. 61/588,404, filed on Jan. 19, 2012.

(51) Int. Cl.
*H01M 10/00* (2006.01)
*H01M 2/08* (2006.01)
*H01M 10/0583* (2010.01)

(52) U.S. Cl.
CPC ............................. *H01M 10/0583* (2013.01)
USPC ........................................ 429/185; 29/623.2

(58) Field of Classification Search
CPC .............. H01M 10/00; H01M 10/045; H01M 10/0459; H01M 10/0472; H01M 10/049; H01M 10/058; H01M 10/0583; H01M 10/0585
USPC ................................ 429/185; 29/623.1, 623.2
See application file for complete search history.

(56) References Cited

U.S. PATENT DOCUMENTS

| 5,888,667 | A | * | 3/1999 | Cheong et al. .................. 429/94 |
| 6,679,926 | B1 | * | 1/2004 | Kajiura et al. ............... 29/623.1 |
| 2003/0017388 | A1 | | 1/2003 | Furusaki |
| 2003/0118900 | A1 | | 6/2003 | Otohata |
| 2005/0202314 | A1 | | 9/2005 | Cherng et al. |
| 2006/0088759 | A1 | | 4/2006 | Roh |
| 2009/0186270 | A1 | * | 7/2009 | Harada et al. ................. 429/185 |
| 2010/0266881 | A1 | * | 10/2010 | You et al. ........................ 429/56 |
| 2011/0045333 | A1 | | 2/2011 | Kim et al. |
| 2011/0052964 | A1 | | 3/2011 | Kim et al. |
| 2011/0091754 | A1 | | 4/2011 | Miyahisa et al. |

(Continued)

FOREIGN PATENT DOCUMENTS

| KR | 1020110018810 | | 2/2011 | |
| KR | 1020110037781 | * | 4/2011 | ............ H01M 10/38 |

(Continued)

*Primary Examiner* — Milton I Cano
*Assistant Examiner* — Michael Dignan
(74) *Attorney, Agent, or Firm* — Robert E. Bushnell, Esq.

(57) ABSTRACT

A fabrication method of a secondary battery having excellent electrolyte impregnating characteristics and excellent productivity without fracture of an electrode plate or separation of an active material is disclosed. The fabrication method includes providing a plurality of first electrode plates and second electrode plates and two separators, attaching the plurality of first electrode plates to portions between the two separators, attaching the plurality of second electrode plates to one of the two separators, winding the separators having the plurality of first and second electrode plates to form a wound electrode assembly, removing curved portions of the outermost separators positioned at exterior sides of the first and second electrode plates to form a stacked electrode assembly and accommodating the stacked electrode assembly in a sheath member.

18 Claims, 14 Drawing Sheets

(56) References Cited

U.S. PATENT DOCUMENTS

| | | |
|---|---|---|
| 2011/0135995 A1 | 6/2011 | Song |
| 2011/0135996 A1 * | 6/2011 | Ahn et al. .................... 429/162 |
| 2011/0151307 A1 * | 6/2011 | Hwang et al. ................. 429/129 |
| 2011/0223465 A1 | 9/2011 | Kanda |
| 2011/0244319 A1 | 10/2011 | Hashimoto |
| 2012/0115037 A1 * | 5/2012 | Kono et al. .................... 429/303 |
| 2012/0171536 A1 * | 7/2012 | Kaneda .......................... 429/94 |

FOREIGN PATENT DOCUMENTS

| | | | | |
|---|---|---|---|---|
| KR | 1020110064068 | | 6/2011 | |
| WO | 2010113254 | | 10/2010 | |
| WO | WO 2011004483 | * | 1/2011 | ............ H01M 10/40 |
| WO | WO 2011135613 | * | 3/2011 | ........ H01M 10/0583 |

* cited by examiner

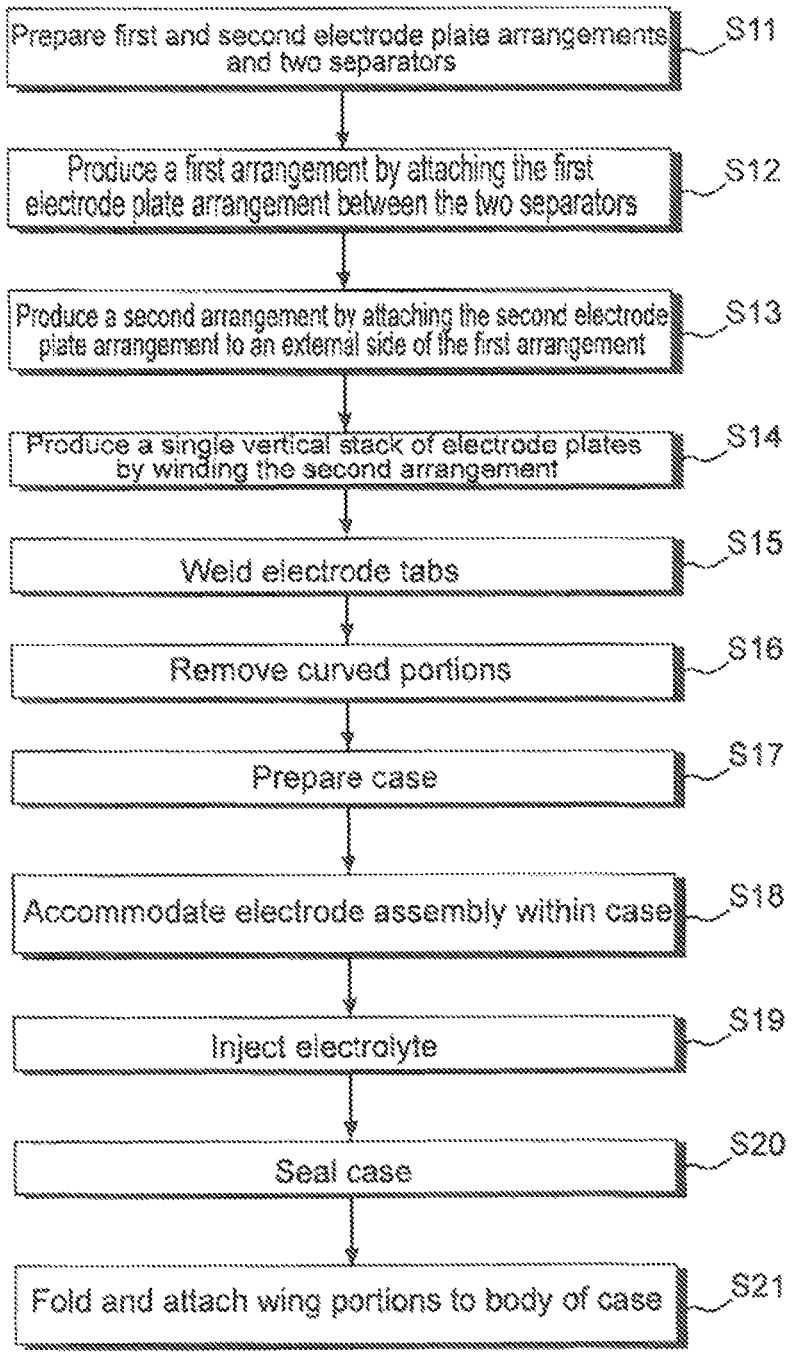

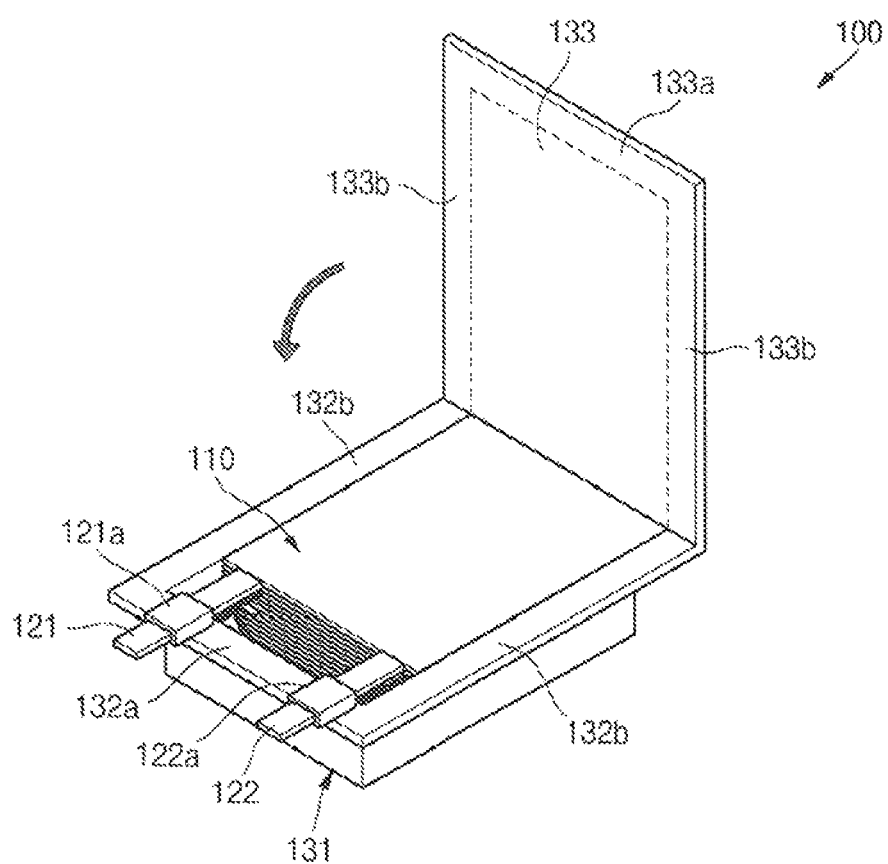

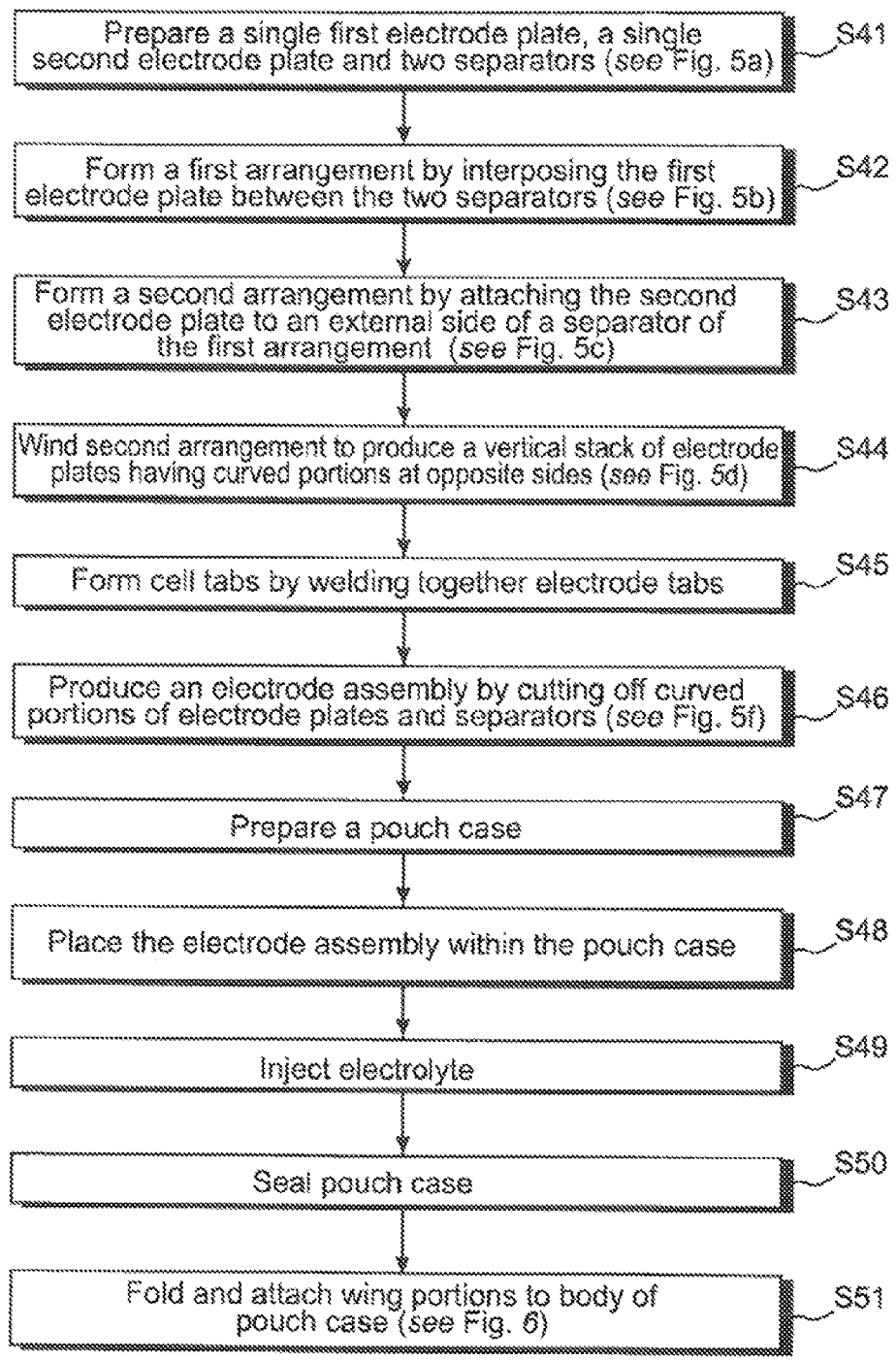

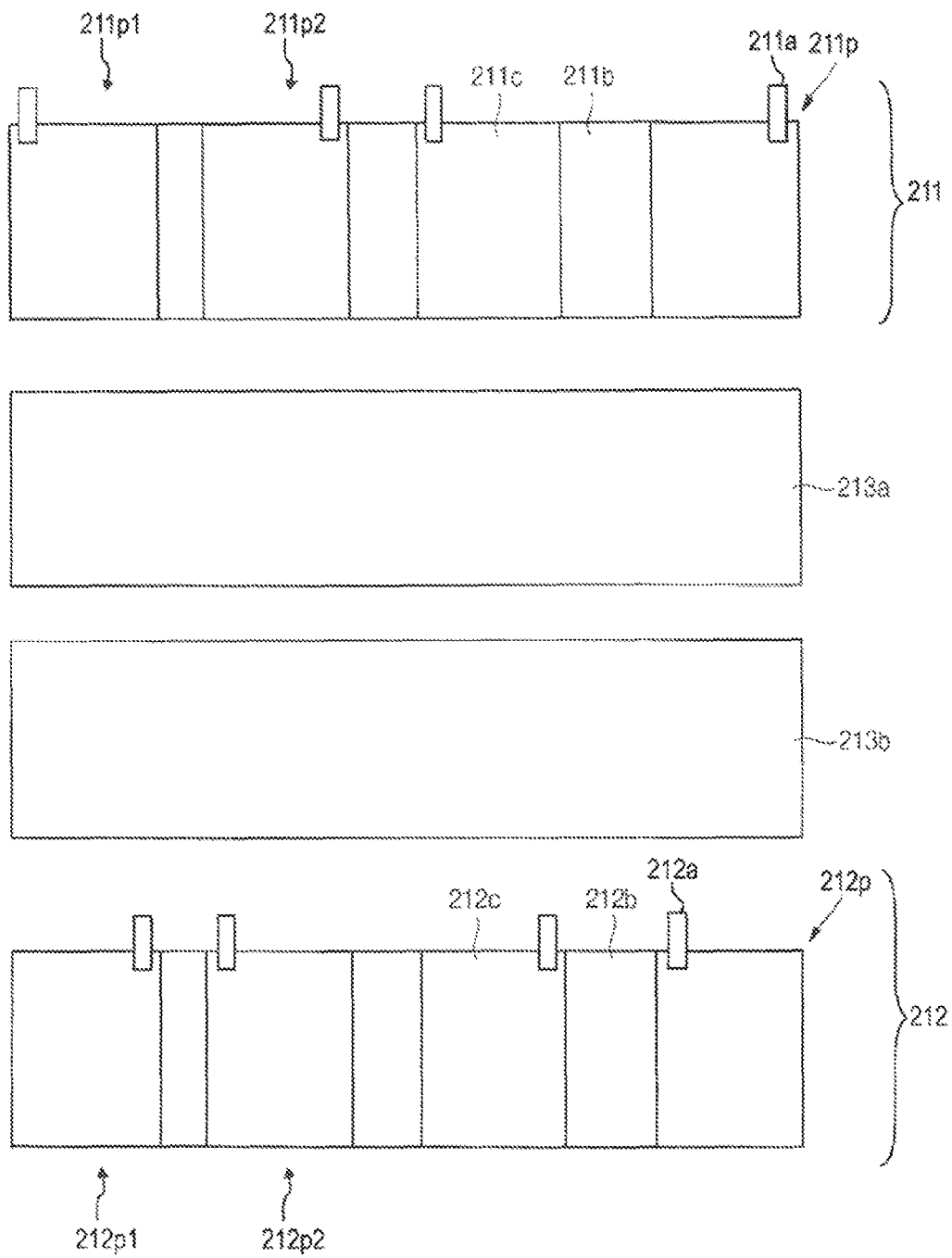

FABRICATING METHOD OF SECONDARY BATTERY

CLAIM OF PRIORITY

This application makes reference to, incorporates the same herein, and claims all benefits accruing under 35 U.S.C. §119 from an application earlier filed in the U.S. Patent and Trademark Office on 19 Jan. 2012 and there duly assigned Ser. No. 61/588,404.

BACKGROUND OF THE INVENTION

1. Field of the Invention

An embodiment of the present invention relates to a fabrication method of a secondary battery.

2. Description of the Related Art

In general, batteries may be largely classified into primary batteries and secondary batteries. The primary batteries are mostly cylindrical batteries, and the secondary batteries are classified into prismatic batteries and cylindrical batteries. The prismatic battery employs a metal can or a pouch as a sheath member, and a battery employing a pouch sheath member is called a "pouch-type" battery.

The prismatic battery is generally manufactured by fabricating a wound or stacked electrode assembly including a negative electrode plate, a separator and a positive electrode plate, accommodating the electrode assembly in a prismatic can or pouch, and injecting an electrolyte into the prismatic can or pouch.

Meanwhile, the wound electrode assembly is fabricated by stacking a negative electrode plate, a separator and a positive electrode plate, shaped of strips, and winding a stacked structure substantially in a jelly-roll configuration, demonstrating excellent productivity. However, since curved portions are formed at opposite sides due to the winding, concentrated stress may be applied to the curved portions, resulting in fracture of an electrode plate or separation of an active material. In addition, since the electrode assembly is wound, electrolyte impregnation passages are limited, thereby deteriorating an electrolyte impregnating characteristic.

In addition, since the stacked electrode assembly is fabricated by stacking a plurality of plates in the order of a negative electrode plate, a separator and a positive electrode plate, no curved portions are generated in the stacked electrode assembly, so that problems, such as fracture of an electrode plate or separation of an active material, may not be caused. However, when stacking is separately performed in the order of a separator, a negative electrode plate, a separator and a positive electrode plate, time required for manufacturing the electrode assembly may be increased.

SUMMARY OF THE INVENTION

An embodiment of the present invention provides a fabrication method of a secondary battery having excellent electrolyte impregnating characteristics and excellent productivity without occurrence of fracture of an electrode plate or separation of an active material.

In one embodiment of the present invention, the electrode assembly is wound by a winding process demonstrating high productivity and curved portions are removed, thereby providing a secondary battery having a stacked electrode assembly. Therefore, since the curved portion is removed from the electrode assembly, fracture of an electrode plate or separation of an active material may not occur. In addition, electrolyte impregnation passages of four directions are provided, thereby improving an electrolyte impregnating characteristic. Moreover, the winding process is employed while demonstrating excellent productivity even with a stacked electrode assembly.

According to one aspect of the present invention, there is provided a method of manufacturing a secondary battery, including preparing two separators, a first electrode plate arrangement and a second electrode plate arrangement, producing a first arrangement by interposing the first electrode plate arrangement between the two separators, producing a second arrangement by attaching the second electrode plate arrangement to an external side of one of the two separators of the first arrangement, winding the second arrangement, forming a single cell tab for each of the first and second electrode plate arrangements by welding a plurality of electrode tabs together, producing an electrode assembly stack by removing curved portions from sides of the wound second arrangement, preparing a case, placing the electrode assembly stack into the case, injecting electrolyte into the case and sealing the pouch case. The first electrode plate may be arranged both directly on top of and directly beneath the two separator sheets. The case may be a pouch-type case.

Each of the first electrode plate arrangement and the second electrode plate arrangement may include a plurality of discrete collector plates, an active region arranged on both sides of each of the collector plates and an electrode tab attached to each collector plate. Each of the first electrode plate arrangement and the second to electrode plate arrangement may instead include a single collector plate a plurality of discrete active regions arranged on both sides of the collector plate and a plurality of electrode tabs attached to the collector plate at locations corresponding to the respective discrete active regions. A spacing between adjacent ones of the discrete active regions may increase from one end to another end of the collector plate. The removing of the curved portions may include cutting away curved portions of the separators. The removing of the curved portions may include cutting away curved portions of the collector plates of the first and second electrode plate arrangements as well as cutting away curved portions of the separators.

The preparing the first and second electrode plate arrangements each may include providing a plurality of discrete collector plates, applying an active material on both sides of each of the collector plates and attaching an electrode tab to each of the collector plates. The preparing the first and second electrode plate arrangements each include providing a single collector plate, producing a plurality of discrete active regions on the collector plate by applying an active material to both sides of the collector plate at each active region and attaching a plurality of electrode tabs to the collector plate at locations corresponding to the active regions, wherein a spacing between adjoining ones of the active regions increases in moving from one end to another end along the collector plate. In the second arrangement, active regions of the second electrode plate arrangement may be aligned with corresponding active regions of the first electrode plate arrangement.

The winding of the second arrangement may produce a single vertical stack of first and second active regions corresponding to the first and second electrode plate arrangements respectively. The winding of the second arrangement may produce a single vertical stack of first and second active regions having curved portions on opposing sides of the single vertical stack being comprised of the two separators as well as portions of first and second collector plates corresponding to the first and second electrode plate arrangements. The winding of the second arrangement may instead produce a single vertical stack of first and second collector plates having first and second active regions respectively arranged thereon and being aligned with each other to and curved portions on opposing sides of the single vertical stack and being comprised only of portions of the separators. The method may also include folding and attaching wing portions of the case to a body portion of the case. The electrode assembly may include two sheets of one of the two separators arranged directly on top of each other at a center of the electrode assembly.

According to another aspect of the present invention, there is provided a secondary battery that includes a sealed pouch case and an electrode assembly within the sealed pouch case, the electrode assembly comprising a single vertical stack of separator sheets and first and second electrode plates, wherein a center of the single vertical stack includes two separator sheets stacked directly on top of each other. The pouch case may be a laminate having of a metal layer interposed between two insulating layers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1a is a flowchart illustrating a fabrication method of a secondary battery generic to both embodiments of the present invention;

FIGS. 2a to 2j sequentially illustrate the fabrication method of a secondary battery shown in FIG. 1b according to the first embodiment of the present invention;

FIG. 4 is a flowchart illustrating a fabrication method of a secondary battery according to a second embodiment of the present invention FIGS. 5a to 5f sequentially illustrate a fabrication method of a secondary battery according to the second embodiment of the present invention.

DETAILED DESCRIPTION OF THE INVENTION

Hereinafter, embodiments of the present invention will be described in detail with reference to the accompanying drawings such that they can easily be made and used by those skilled in the art.

Turning now to FIG. 1a, FIG. 1a is a flowchart illustrating a fabrication method of a secondary battery generic to both embodiments of the present invention to show how both embodiments are connected. As illustrated in FIG. 1a, the fabrication method of a secondary battery generic to both embodiments of the present invention includes preparing first and second electrode plate arrangements and two separators (S11), producing a first arrangement by attaching the first electrode plate arrangement between the two separators (S12), producing a second arrangement by attaching the second electrode plate arrangement to exterior sides of first arrangement (S13), winding the second arrangement to produce a single vertical stack of electrode plates (S14), welding a plurality of first and second electrode tabs together (S15), removing curved portions (S16); preparing a case (S17), accommodating the electrode assembly within the case (S18), injecting an electrolyte into the case (S19), sealing the case (S20), and folding and attaching wing portions of the case to the body portion of the case (S21).

Figure 1B:
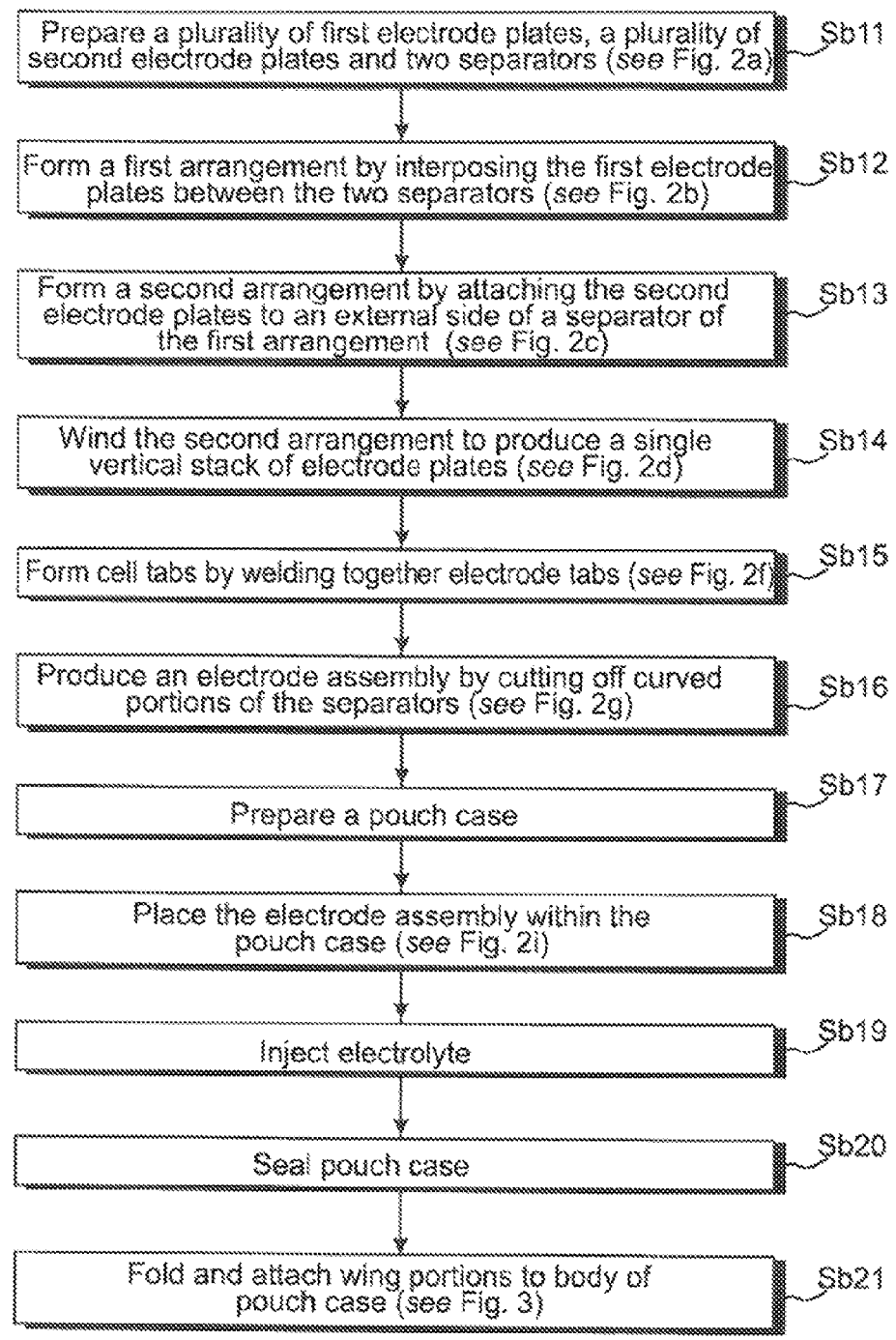
FIG. 1b is a flowchart illustrating a fabrication method of a secondary battery according to a first embodiment of the present invention.

Turning now to FIG. 1b, FIG. 1b is a flow chart illustrating a method of fabricating a secondary battery according to the first embodiment of the present invention. As illustrated in FIG. 1b, the fabrication method of a secondary battery according to the first embodiment of the present invention includes preparing a plurality of first and second electrode plates and two separators (Sb11), forming a first arrangement by interposing the first electrode plates between the two separators (Sb12), forming a second arrangement by attaching the second electrode plates to an exterior side of one of the separators of the first arrangement (Sb13), winding the second arrangement to produce a vertical stack (Sb14), producing first and second cell tabs by welding a plurality of first and second electrode tabs (Sb15), producing an electrode assembly by cutting off curved portions of the separators (Sb16); preparing a pouch case (Sb17), accommodating the electrode assembly within the pouch case (Sb18), injecting an electrolyte (Sb19), sealing the pouch case (Sb20), and folding and attaching wing portions of the pouch case to the body portion of the pouch case (Sb21).

Figure 2A:
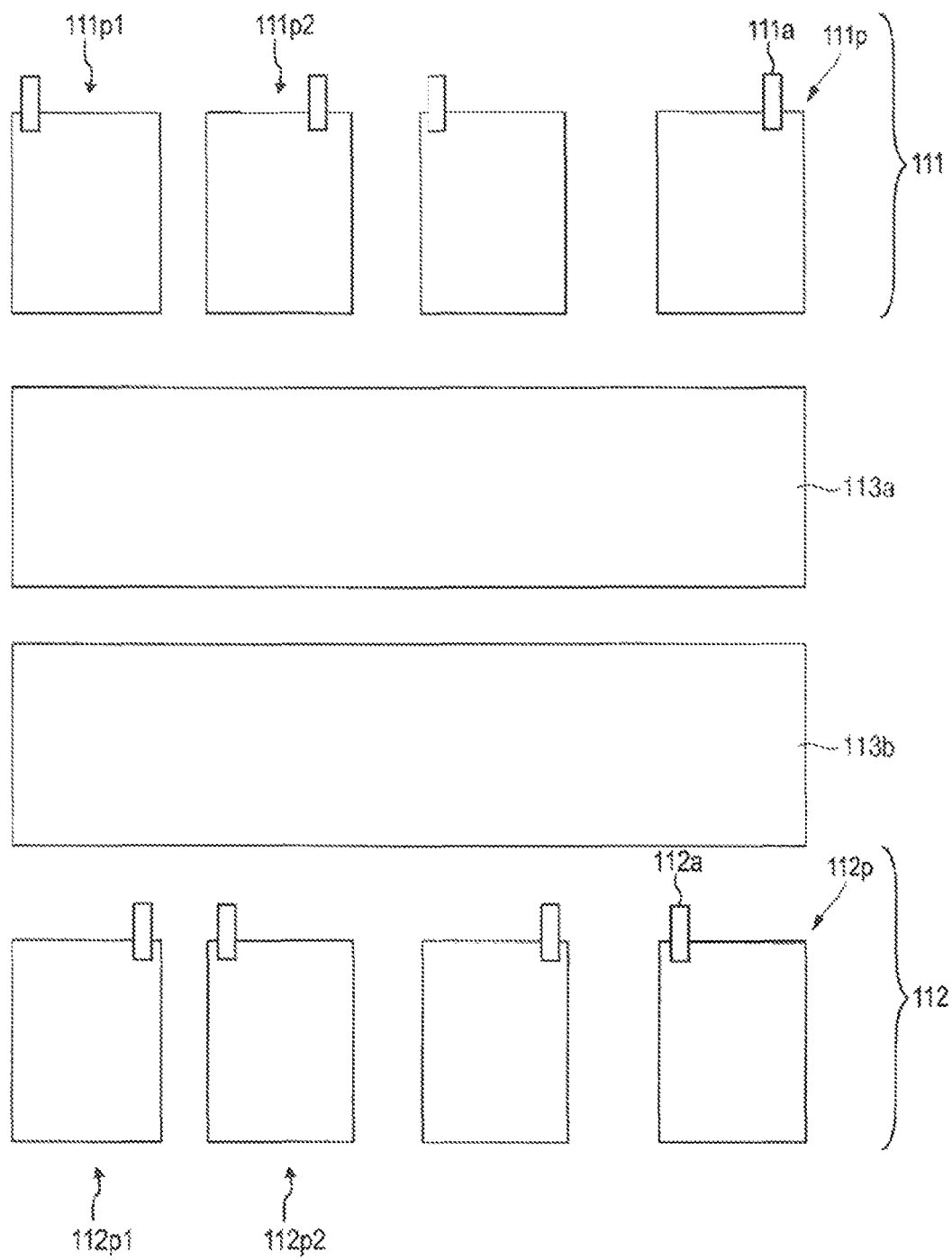

Turning now to FIGS. 2a to 2j, FIGS. 2a to 2j sequentially illustrate the fabrication method of a secondary battery according to the flowchart of FIG. 1b. As illustrated in FIG. 2a, in the preparing of first and second electrode plate arrangements 111 and 112 and the separators 113a and 113b (Sb11), a plurality of first electrode plates 111p, a plurality of second electrode plates 112p, and approximately two separators 113a and 113b are prepared. In the first embodiment, the first electrode plate arrangement 111 includes a plurality of first electrode plates 111p, and the second electrode plate arrangement 112 includes a plurality of second electrode plates 112p Here, first electrode tabs 111a are electrically connected to the first electrode plates 111p and second electrode tabs 112a are electrically connected to the second electrode plates 112p. In the exemplary embodiments, when the first electrode plates 111p are negative electrodes, the first electrode tabs 111a may be made out of a copper foil or a nickel foil, and when the second electrode plates 112p are positive electrodes, the second electrode tabs 112a may be made out of an aluminum foil. The electrode tabs 111a and 112a are positioned at locations that are spaced so that, upon being wound, all the first electrode tabs 111a are arranged at one side and all of the second electrode tabs 112a are arranged at the other side.

In the first embodiment, each first electrode plate 111p includes a discrete collector plate 111b having an active material 111c arranged on both sides and each second electrode plate 112p includes a discrete collector plate 112b having an active material 112c arranged on both sides. When the first electrode plates 111p are negative electrodes, the first current collector plate 111b may be made out of a copper foil and the first active material 111c may be graphite. In addition, as described above, the first electrode tabs 111a may be made out of a copper foil or a nickel foil. However, the present invention does not limit materials of the first electrode tabs 111a, the first current collector plates 111b and the first active material 111c to those listed herein as other known materials may instead be used.

When the second electrode plates 112p are positive electrodes, the second current collector plates 112b may be made out of aluminum foil and the second active material 112c may be lithium cobalt oxide. In addition, as described above, the second electrode tabs 112a may be made out of an aluminum foil. However, the present invention does not limit the materials of the second electrode tabs 112a, the second current collector plates 112b and second active material 112c to those listed herein as other known materials may instead be used.

In addition, the separators 113a and 113b may be porous polyolefin-based separators or ceramic separators. The polyolefin-based separators have a triple-layered structure, for example, a cylinder type pore structure of PP (polypropylene)/PE (polyethylene)/PP, or a single-layered structure, for example, a grid type pore structure of PE. In addition, the ceramic separators may be formed by coating ceramic on a surface of a polyolefin-based separator or coating ceramic on a surface of a non-woven fabric separator. Here, the ceramic may be generally alumina. However, the present invention does not limit the materials of separators to those listed herein as other known materials may instead be used.

In the first embodiment, since the first electrode plate arrangement 111 includes a plurality of first electrode plates 111p that are discrete and separated from each other, they are electrically disconnected from each other. Also in the first embodiment, since the second electrode plate arrangement 112 includes a plurality of second electrode plates 112p are also discrete and separated from each other, they are also electrically disconnected from each other.

Figure 2B:
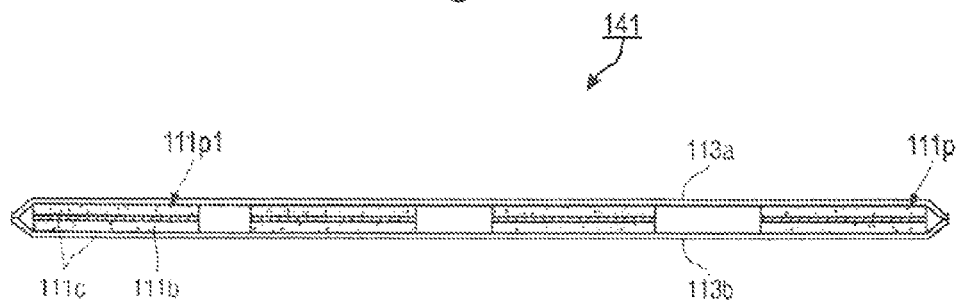

Turning now to FIG. 2b, FIG. 2b illustrates a first arrangement 141. The first arrangement 141 is produced by placing the first electrode plate arrangement 111, including the first electrode plates 111p, between the two separators 113a and 113b as in step (Sb12). In the first arrangement 141 of FIG. 2b, the spacing between adjacent ones of the first electrode plates 111p increases from one end to another end so that when wound, the electrode plates can form a single vertical stack. In the first arrangement 141 of FIG. 2b, the predetermined distance gradually increases as it gets farther from the first electrode plate 111p1 where the winding starts. That is to say, as the electrode assembly 110 is wound, a length of a curved portion to be described below increases, so that the predetermined distance between the first electrode plates 111, corresponding to the length, must also increase.

Figure 2C:
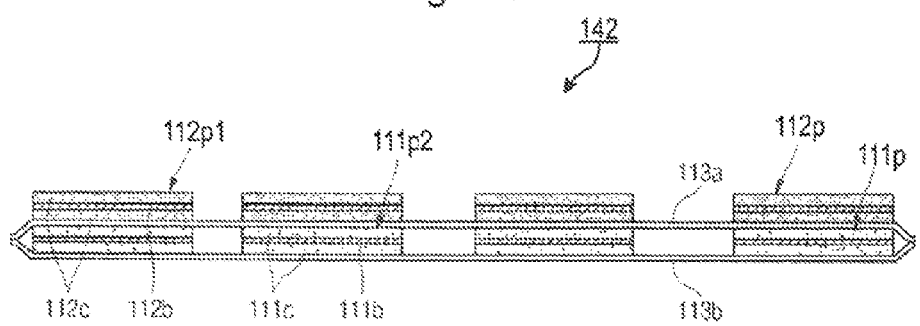

Turning now to FIG. 2c, FIG. 2c illustrates the second arrangement 142. As illustrated in FIG. 2c, the second arrangement 142 is produced by attaching the second electrode plate arrangement 112, including the second electrode plates 112p, to an exterior side of one of two separators 113a and 113b of the first arrangement 141 as in step (Sb13). In forming the second arrangement 142 of FIG. 2c, the second electrode plates 112p are attached to exterior sides of the separator 113a and are arranged at locations corresponding to the first electrode plates 111p.

Figure 2D:
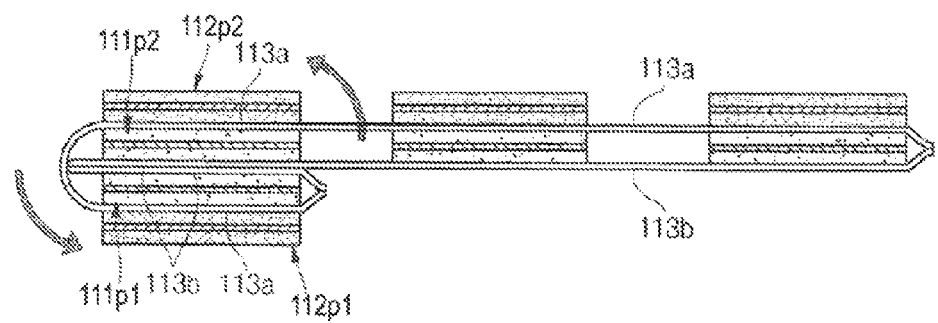
Figure 2E:
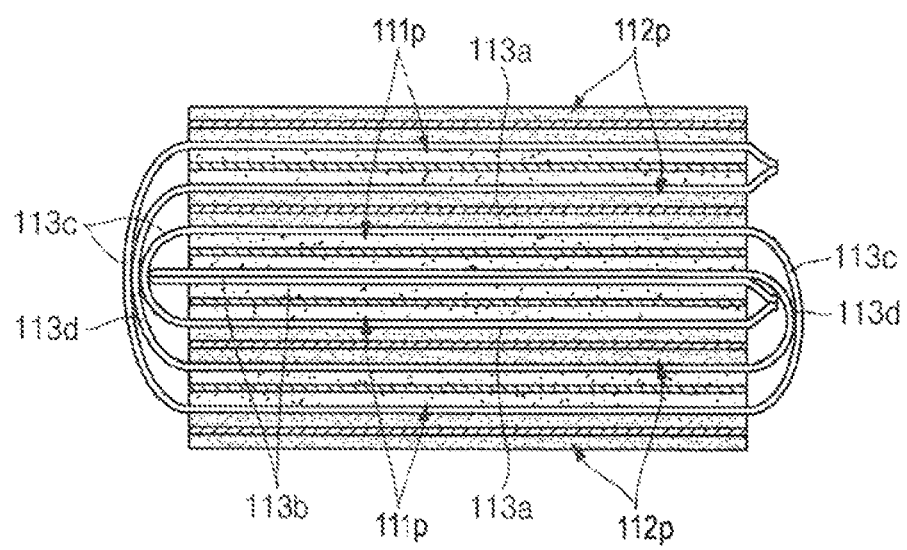

Turning now to FIG. 2d, FIG. 2d illustrates the winding process of when the second arrangement 142 of FIG. 2c is wound in a counterclockwise direction starting at an end of the second arrangement 142 where the electrode plates are spaced closest together. FIG. 2e illustrates the electrode assembly after with winding process has completed. As illustrated in FIGS. 2d and 2e, in the winding of the of the second arrangement 142 of FIG. 2c as per step S14, the separators 113a and 113b are wound roughly counterclockwise with respect to the leftmost ones of the first and second electrode plates 111p1 and 112p1. This results in two separators 113b being closely coupled to each other at the center of the electrode assembly 110, and the first electrode plates 111p are positioned both above and below the separators 113b facing each other. In addition, separator 113a is positioned above the first electrode plates 111p and the separator 113a is also positioned beneath the first electrode plate 111p. In addition, the second electrode plate 112p is positioned on the separator 113a and the second electrode plate 112p is also positioned beneath the separator 113a.

This arrangement of having two first electrode plates 111p arranged at the center of the electrode assembly is unique and advantageous. Often, the first electrode plates 111p are the negative electrode plates having a negative active layer 111c on both sides. Since the negative active layer is more reactive than the positive active layer, by having two negative electrode plates 111p at the center results in a more efficient design for a secondary battery, allowing for improved efficiency and higher capacity per unit volume.

After completion of the winding step, the plurality of first electrode plates 111p and the second electrode plates 112p are stacked upwardly and downwardly in a single vertical stack. In addition, as the result of the winding of the separators 113a and 113b, curved portions 113c and 113d of the separators 113a and 113b protruding from the first and second electrode plates 111p and 112p are formed at opposite sides of the stack of first electrode plates 111p and second electrode plates 112p. The curved portions 113c and 113d are gradually lengthened upwardly and downwardly away from the center of the electrode assembly 110.

Figure 2F:
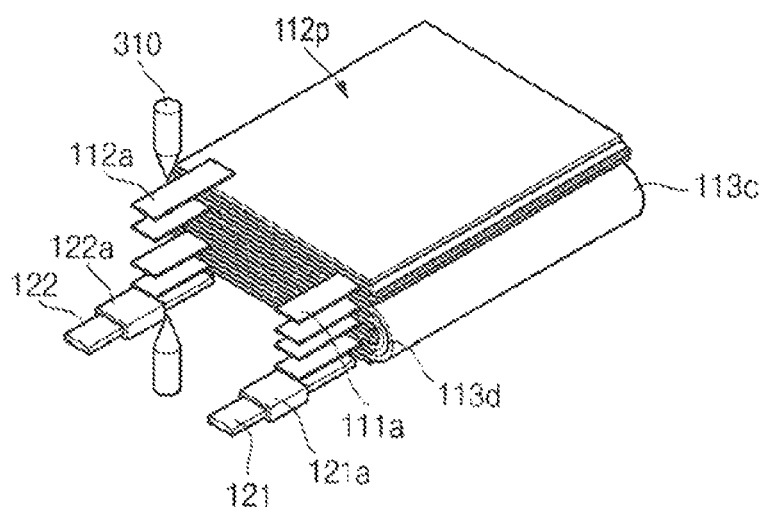

As illustrated in. FIG. 2f, in the welding a plurality of first and second electrode tabs 111a and 112a (Sb15), the first electrode tabs 111a provided in the plurality of first electrode plates 111p are welded together to produce a first cell tab 121, and the second electrode tabs 112a provided in the plurality of second electrode plates 112p are welded together to produce a second cell tab 122. Here, the welding using a welding tool 310 may include, but is not limited to, resistance welding, ultrasonic welding or laser welding. As a result of the welding, each of the first electrode plates 111p become electrically connected to each other and each of the second electrode plates 112p become electrically connected to each other.

In addition, a first insulating tape 121a may be attached to the first cell tab 121 and a second insulating tape 122a may be attached to the second cell tab 122 to prevent an electrical short between the pouch case 130 and each of the first and second cell tabs 121 and 122.

Figure 2G:
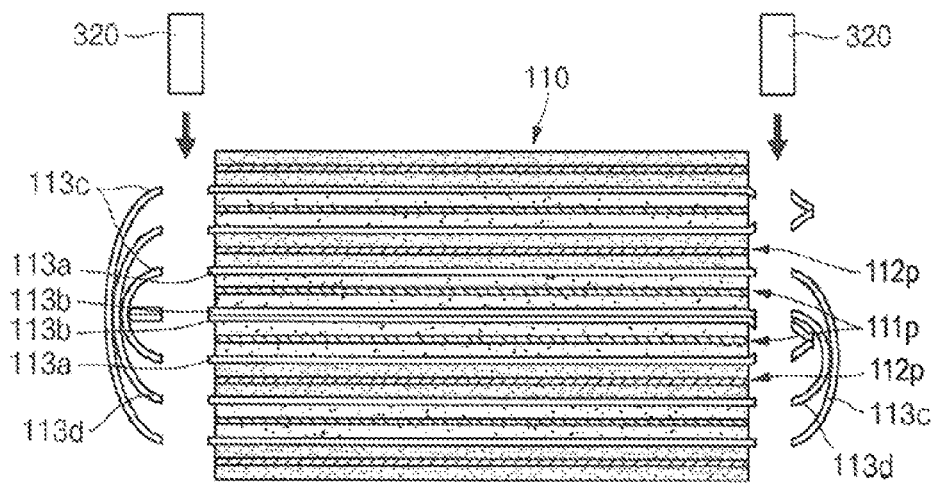

As illustrated in FIG. 2g, in the removing of the curved portions 113c and 113d of the separators 113a and 113b (Sb16), the curved portions 113c and 113d of the separators 113a and 113b, which are a predetermined length protruding and curved at opposite sides of the stack of first and second electrode plates 111p and 112p, are cut. Here, the cutting may be performed by mechanical sawing using a cutting tool 320 or a laser beam, but the present invention is in no way so limited thereto.

Alternatively, the removing of the curved portions of the separators 113a and 113b (Sb16) may be performed prior to the welding of the plurality of first and second electrode tabs 111a and 112a (Sb15).

Figure 2H:
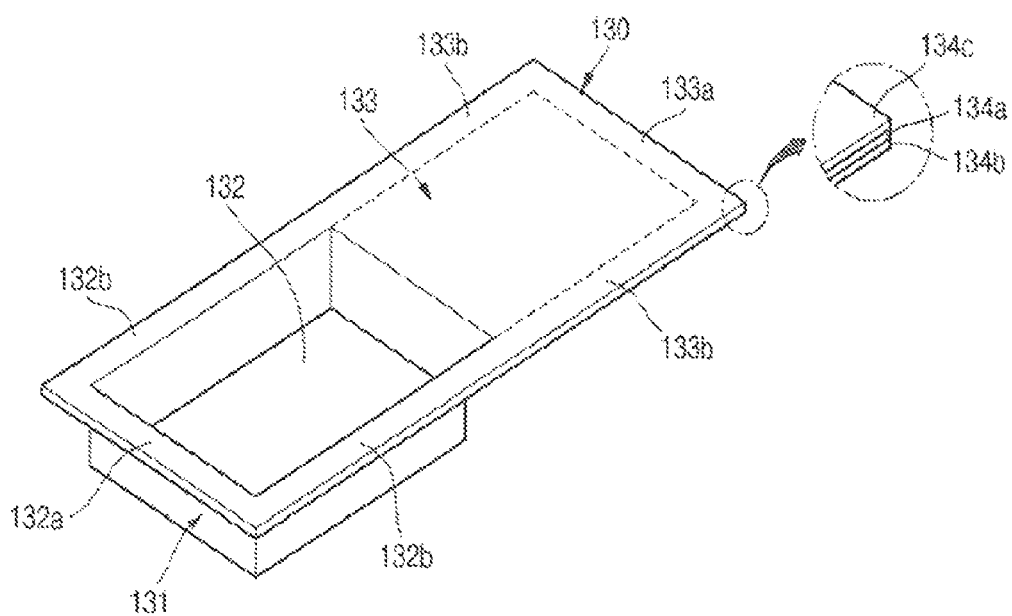

As illustrated in FIG. 2h, in the preparing of the pouch case (Sb17), the pouch case 130 having a first region 131 having a cavity 132 of a predetermined depth and a second region 133 extending a predetermined length from the first region 131 is formed. Here, the cavity 132 has a depth and a width sufficient enough to accommodate the electrode assembly 110. In addition, there is one front peripheral region 132a and two side peripheral regions 132b in the vicinity of the cavity 132, and the peripheral regions 132a and 132b are thermally fused to peripheral regions 133a and 133b of the second region 133.

Here, the pouch case 130 includes a metal layer 134a made of, for example, aluminum or steel, preventing induction of external moisture and offering strength, a first insulation layer 134b made of, for example, a polyethylene terephthalate (PET) resin or nylon resin, and formed on one surface of the metal layer 134a to provide for an insulating state and a second insulation layer 134c formed on the other surface of the metal layer 134a and made of casted polypropylene (CPP) or polypropylene (PP) to be thermally fused later.

In addition, while the present invention has been described using a sheath member as the pouch case 130 by way of example, a general prismatic can or case may instead be used as the pouch case 130.

Figure 2I:
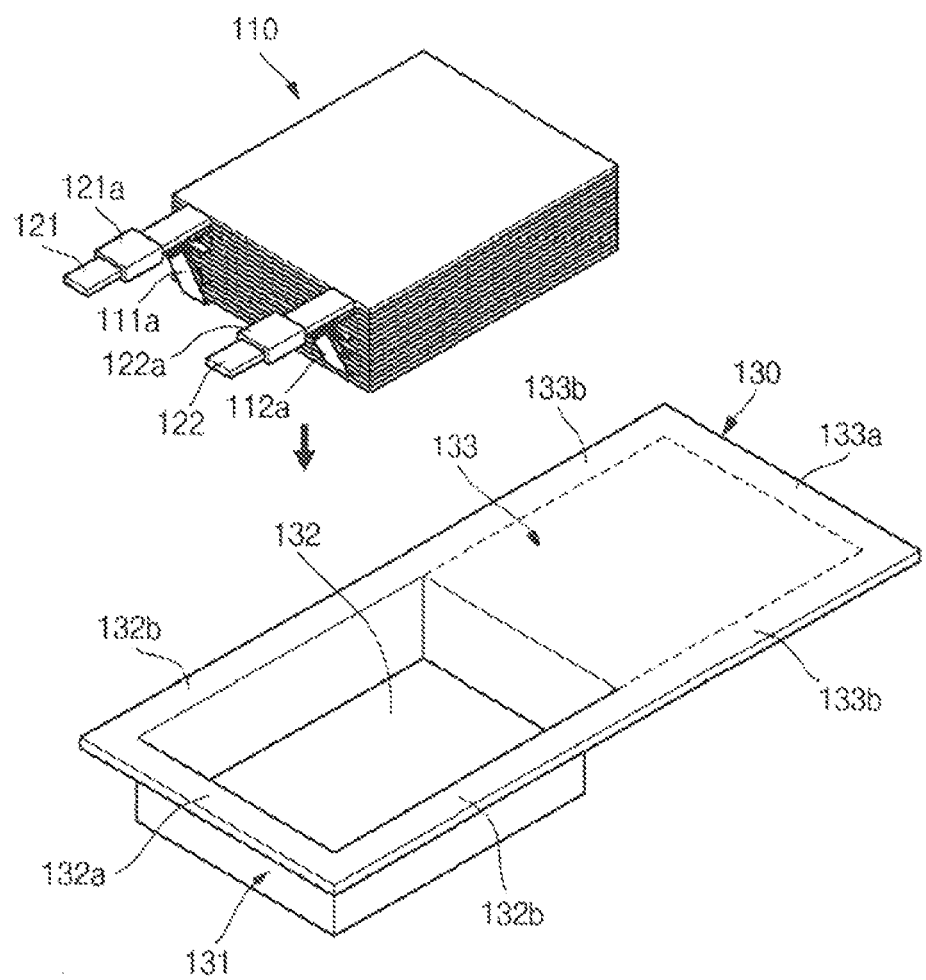

As illustrated in FIG. 2i, in the accommodating of the electrode assembly 110 within the pouch case 130 (Sb18), as described above, at least one electrode assembly 110 having the curved portions 113c and 113d removed from the separators 113a and 113b is accommodated within the cavity 132 of the pouch case 130. Here, the first cell tab 121 to which the plurality of first electrode tabs 111a are welded together and the second cell tab 122 to which the plurality of second electrode tabs 112a are welded together, protrude a predetermined distance to an exterior of pouch case 130 through the front peripheral region 132a. Here, the first insulating tape 121a arranged on the first cell tab 121 and the second insulating tape 122a arranged on the second cell tab 122 are arranged at the front peripheral regions 132a and 133a of the pouch case 130.

In addition, in the injecting of electrolyte (Sb19), as described above, in a state in which the electrode assembly 110 is accommodated within the pouch case 130, the electrolyte is supplied to the cavity 132 of the pouch case 130. Here, while the electrode assembly 110 is manufactured by a winding process, the curved portions 113c and 113d of the separators 113a and 113b are all removed, so that the electrolyte may be supplied to the electrode assembly 110 substantially in four directions. Therefore, the electrolyte impregnating characteristics can be optimized.

In addition, the electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$, but the present invention is in no way so limited thereto.

As illustrated in FIG. 2j, in the sealing of the pouch case 130 (Sb20), three peripheral regions 132a and 132b provided in the first region 131 and three peripheral regions 133a and 133b provided in the second region 133 are sealed using a thermal compressing tool (not shown). Here, second insulation layers 134c of the first and second regions 131 and 133, made of casted polypropylene (CPP) or polypropylene (PP) are welded to each other, thereby achieving a seal. Upon sealing of pouch case, the first cell tab 121 and the second cell tab 122 provided in the electrode assembly 110 extend outwardly a predetermined length through the peripheral regions 132a and 133a.

Figure 3:
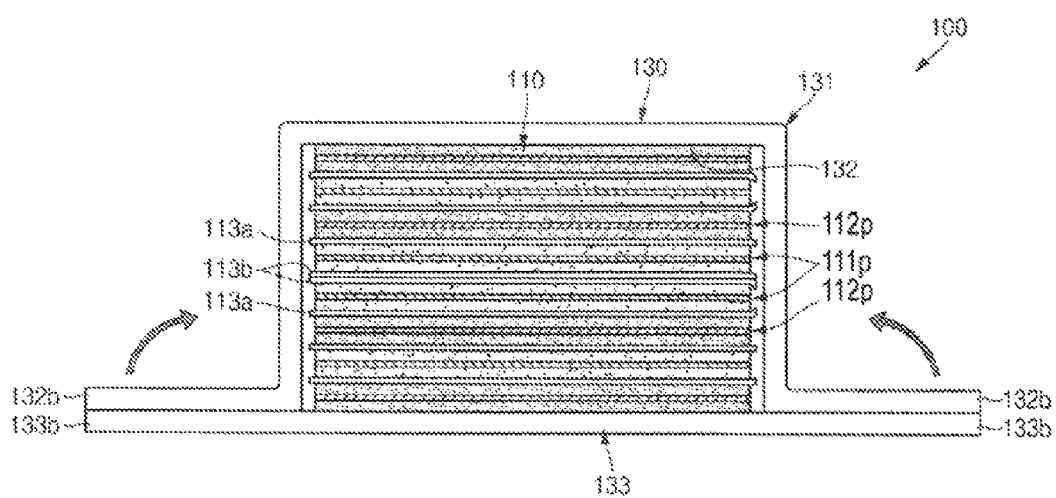
FIG. 3 is a cross-sectional view of a secondary battery fabricated by the fabrication method shown in FIG. 1b.

Turning now to FIG. 3, FIG. 3 is a cross-sectional view of a secondary battery 100 fabricated by the fabrication method shown in FIG. 1b. As illustrated in FIG. 3, the secondary battery 100 includes an electrode assembly 110 and a pouch case 130. Although not shown, the first cell tab and the second cell tab may protrude and extend to the exterior side of the pouch case 130.

As described above, two separator sheets 113b are centrally positioned in the electrode assembly 110, the first electrode plates 111p are positioned above and beneath the two separators 113b, separators 113a are positioned above and beneath the first electrode plates 111p, and the second electrode plates 112p are positioned above and beneath the separators 113a. In addition, the plurality of first and second electrode plates 111p and 112p are stacked upwardly and downwardly. By having two first electrode plates 111p arranged at a center and by having these first electrode plates negative electrode plates having negative active material thereon, activity of the electrode assembly can be optimized since the negative active material is more reactive than the positive active material.

In addition, the pouch case 130 includes a first region 131 having a cavity 132 and a second region 133 thermally fused to the first region 131. Peripheral regions 132b of the first region 131 corresponding to peripheries of the cavity 132, and peripheral regions 133b of the second region 133 are thermally fused to each other, thereby protecting the electrode assembly 110 within the pouch case 130 from external surrounding factors.

Meanwhile, wing portions of the pouch case denoted by peripheral regions 132b and 133b of the first region 131 and the second region 133 thermally fused to each other are upwardly bent or folded toward the cavity 132 of the first region 131 (Sb21), thereby minimizing a width of the secondary battery 100.

As described above, in the fabrication method of the secondary battery 100 according to the first embodiment of the present invention and the secondary battery 100 fabricated by the fabrication method, the electrode assembly 110 is manufactured by a winding process having excellent productivity, while having a stacked configuration and having optimal electrolyte impregnating characteristics. That is to say, after the electrode assembly 110 is wound, the curved portions 113c and 113d of the separators 113a and 113b are all removed, thereby providing the electrode assembly 110 having a stacked configuration. Accordingly, since the curved portions 113c and 113d are removed from the electrode assembly 110, fracture of an electrode plate or separation of an active material may not occur. In addition, since electrolyte impregnation passages are increased, electrolyte impregnating characteristics can be improved. Also, since the center two electrode plates are negative electrode plates having the negative active material arranged thereon, the efficiency of the electrode assembly is further optimized. Moreover, even if the electrode assembly 110 has a stacked configuration, the winding process is employed in manufacturing the electrode assembly 110, thereby demonstrating excellent productivity.

Turning now to FIG. 4, FIG. 4 is a flow chart illustrating a method of fabricating a secondary battery according to the second embodiment of the present invention. As illustrated in FIG. 4, the fabrication method of a secondary battery according to the second embodiment of the present invention includes preparing a single first electrode plate, a single second electrode plate and two separators (S41), forming a first arrangement by interposing the first electrode plate between the two separators (S42), forming a second arrangement by attaching the second electrode plate to an exterior side of one of the separators of the first arrangement (S43), winding the second arrangement to produce a vertical stack (S44), producing first and second cell tabs by welding a plurality of first and second electrode tabs (S45), producing an electrode assembly by cutting off curved portions of the electrode plates and the separators (S46), preparing a pouch case (S47), accommodating the electrode assembly within the pouch case (S48), injecting an electrolyte into the pouch case (S49), sealing the pouch case (S50), and folding and attaching wing portions of the pouch case to the body portion of the pouch case (S51).

Figure 5B:
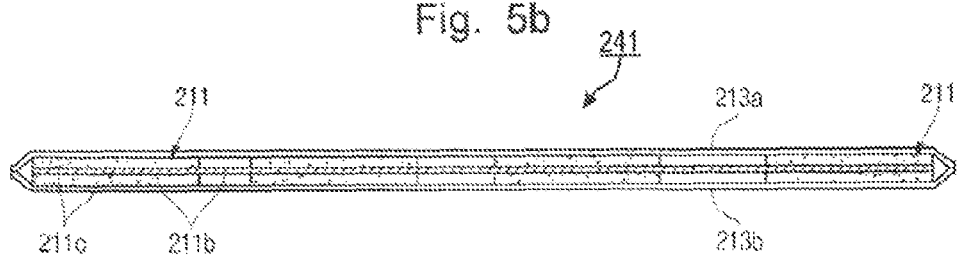

Turning now to FIGS. 5a to 5f, FIGS. 5a to 5f sequentially illustrate a fabrication method of a secondary battery according to the second embodiment of the present invention and according to the flowchart of FIG. 4. As illustrated in FIG. 5a, in preparing first and second plate arrangements 211 and 212 and separators 213a and 213b, a first electrode plate arrangement 211 that includes a single first current collector plate 211b, a second electrode plate arrangement 212 that includes a single second current collector plate 212b and approximately two separators 213a and 213b are prepared. Here, a plurality of first electrode tabs 211a are attached to the first electrode plate arrangement 211 and a plurality of second electrode tabs 212a are attached to the second electrode plate arrangement 212. The electrode tabs 211a and 212a are positioned at locations along the collector plates 211b and 212b at locations that correspond to active regions 211c and 212c and are spaced so that, upon being wound, all the first electrode tabs 211a are arranged at one side and all of the second electrode tabs 212a are arranged at the other side. Unlike the first embodiment of FIGS. 1b-3, the second embodiment uses a single long, continuous first current collector plate 211b and a single long, continuous second collector plate 212b in the first and second electrode plate arrangements 211 and 212 respectively.

Turning now to FIG. 5b, FIG. 5b illustrates a first arrangement 241. As illustrated in FIG. 5b, the first arrangement 241 is formed by inserting the first electrode plate arrangement 211 between the two separators 213a and 213b. Here, the first electrode plate arrangement 211 includes just a single first current collector plate 211b having a plurality of discrete first active material regions 211c and a plurality of first electrode tabs 211a. In addition, a distance between the plurality of first active material regions 211c formed in the one first current collector plate 211b gradually increases as it gets farther from a winding start region. That is to say, as the electrode assembly 210 is wound, a length of a curved portions to be described below increases, so that the predetermined distance between adjoining first active material regions 211c, corresponding to the length, may also increase. Here, assuming that a single first active material region 211c corresponds to a single first electrode plate 211p, all of the first electrode plates 211p are electrically connected through the one first current collector plate 211b at this time.

Figure 5C:
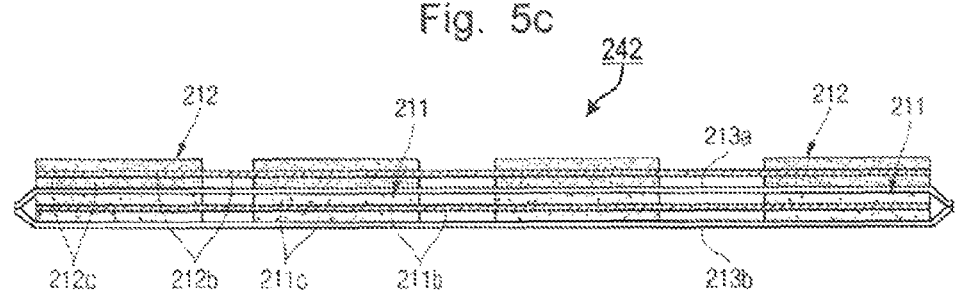

Turning now to FIG. 5c, FIG. 5c illustrates a second arrangement 242. The second arrangement 242 is produced by attaching the second electrode plate arrangement 212 to an external side of one of the two separators 213a and 213b of the first arrangement 241 of FIG. 5b. As illustrated in FIG. 5c, in attaching the second electrode plate arrangement 212 that includes the one second current collector plate 212b onto an exterior side of one of separators 213a and 213b of the first arrangement 241 of FIG. 5b, the active regions 212c of the second electrode plate arrangement 212 line up with corresponding active regions 211c of the first electrode plate arrangement 211, thereby producing the second arrangement 242 as illustrated in FIG. 5c.

In the second embodiment and in FIGS. 5a and 5c, the second electrode plate arrangement 212 includes one second current collector plate 212b, a plurality of second active material regions 212c and a plurality of second electrode tabs 212a. In addition, in the second electrode plate arrangement 212 of FIGS. 5a and 5c, the plurality of second active material regions 212c are formed at regions that correspond to the plurality of first active material regions 211c. That is to say, in the second arrangement 242 of FIG. 5c, the second active material regions 212c and the first active material regions 211c and aligned with each other. In addition, assuming that a single second active material region 212c corresponds to a single second electrode plate 212p, all of the second electrode plates 212p are electrically connected through the single second current collector plate 212b at this time.

Figure 5D:
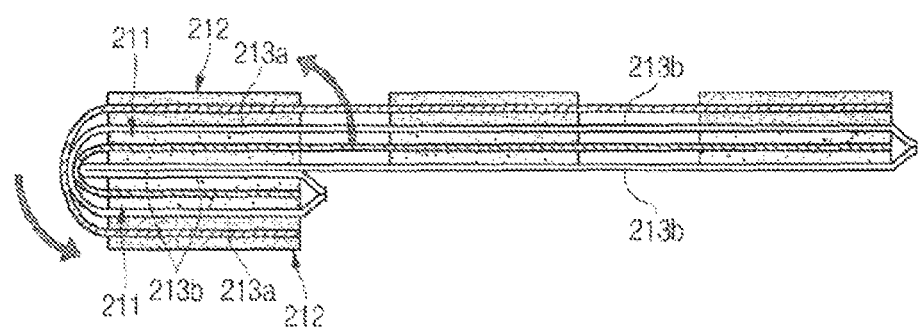
Figure 5E:
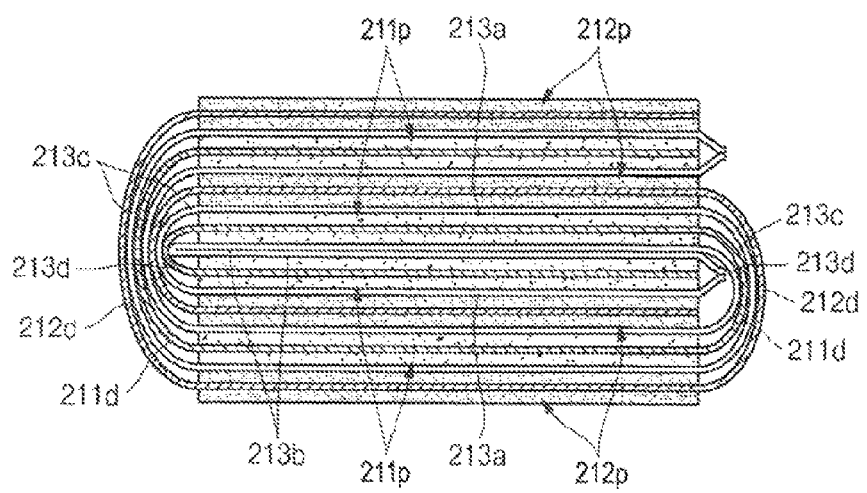

FIG. 5d illustrates the winding process of the second arrangement 242 of FIG. 5c and FIG. 5e illustrates the vertical electrode stack produced as a result of the winding process of FIG. 5d. As illustrated in FIGS. 5d and 5e, in winding the separators 213a and 213b together with the first and second current collector plates 211b and 212b, the separators 213a and 213b are wound roughly counterclockwise with respect to the leftmost ones of the first and second electrode plates 211p and 212p. As a result, two separator sheets 213b are closely coupled to each other at the center of the electrode assembly 210, and the first electrode plates 211p are positioned above and below the two separator sheets 213b facing each other. In addition, the separator 213a is positioned both above and beneath the first electrode plates 211p and the second electrode plates 212p are positioned both above and beneath the separator 213a. Here, for convenience sake of explanation, the first active material regions 211c are defined as the first electrode plates 211p and the second active material regions 212c are defined as the second electrode plates 212p.

In the above-described manner, the plurality of first electrode plates 211p and the second electrode plates 212p are stacked upwardly and downwardly in a single stack. In addition, as a result of the winding of the separators 213a and 213b, curved portions 213c and 213d of the separators 213a and 213b are formed at opposite sides of the single stack of first electrode plates 211p and the second electrode plates 212p. The curved portions 213c and 213d are gradually lengthened upwardly and downwardly away from the center of the electrode assembly 210. Unlike the first embodiment of FIGS. 1b-3, curved portions 211d and 212d of first and second collector plates 211b and 212b respectively are also arranged on left and right sides of the stack in the second embodiment.

Figure 5F:
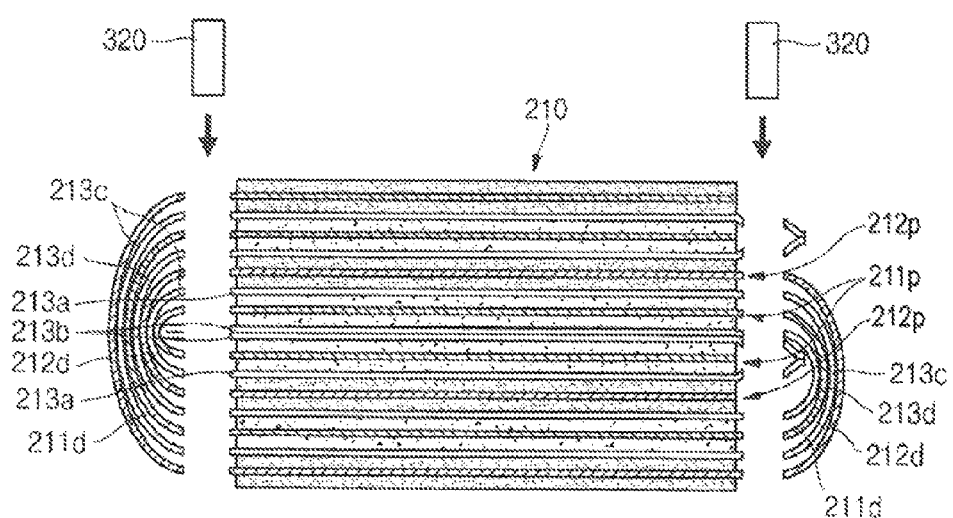

As illustrated in FIG. 5f, in removing curved portions 213c, 213d, 211d and 212d from the separators 213a and 213b and the first and second collector plates 211b and 212b, the curved portions 213c, 213d, 211d and 212d of the separators 213a and 213b and the first and second collector plates 211b and 212b are cut for removal. Here, the cutting may be performed by mechanical sawing or laser beam, but the present invention is in no way so limited thereto.

In addition, before or after removing the curved portions 213c, 213d, 211d and 212d of the separators 213a and 213b and the first and second collector plates 211b and 212b, the plurality of first electrode tabs 211a may be welded together to produce a first cell tab and the plurality of second electrode tabs 212a may be welded together produce a second cell tab. As a result of this welding, each of the first electrode plates 211p are electrically connected to each other and each of the second electrode plates 212p are electrically connected to each other. Therefore, despite the cutting and removal of the curved portions 211d and 212d that would otherwise isolate ones of electrode plates 211p and ones of electrode plates 212p from each other, the welding of tabs 211a and 212a to produce first and second cell tabs electrically connects the first electrode plates 211p together and electrically connects second electrode plates 212p together.

By removing the curved portions of the separators and collector plates, there is less stress on each of the electrode plates, resulting in an improved design with improved electrolyte impregnation characteristics. Furthermore, by having two first electrode plates 211p arranged at a center of the electrode assembly and by having these first electrode plates negative electrode plates having negative active material thereon, activity of the electrode assembly can be optimized since the negative active material is more reactive than the positive active material.

Thereafter, after preparing the pouch case 230, the electrode assembly 210 may then be accommodated within the pouch case 230, an electrolyte may be injected into the pouch case and the pouch case 230 may be sealed. These steps are the same as or similar to those of the first embodiment, and a detailed description thereof will be omitted.

Figure 6:
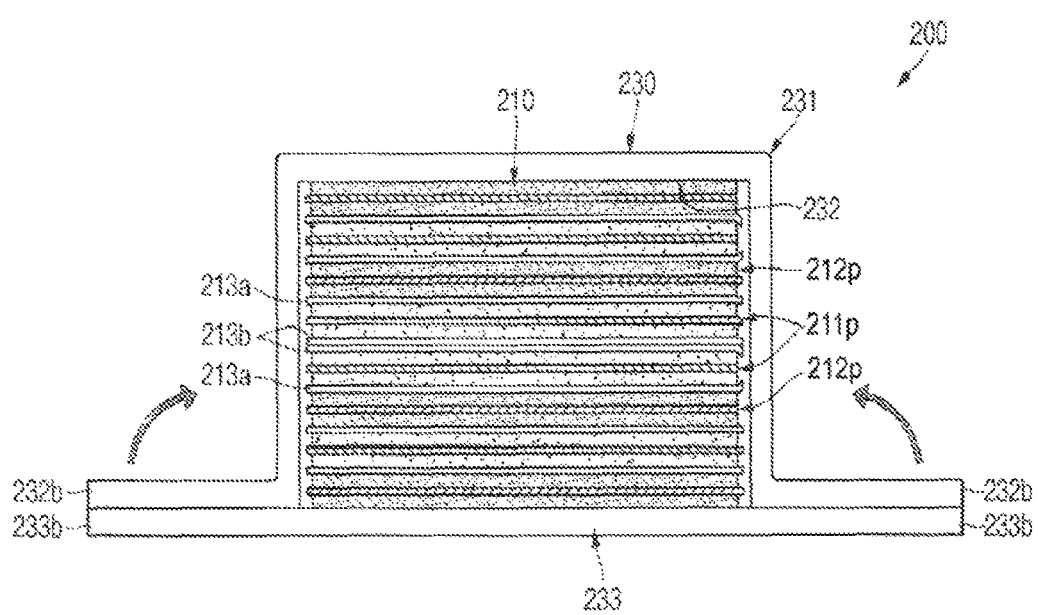
FIG. 6 is a cross-sectional view of a secondary battery fabricated by the fabrication method shown in FIGS. 5a to 5f.

Turning now to FIG. 6, FIG. 6 is a cross-sectional view of a secondary battery 200 fabricated by the fabrication method shown in FIGS. 5a to 5f. As illustrated in FIG. 6, the secondary battery 200 according to the second embodiment of the present invention includes an electrode assembly 210 and a pouch case 230.

As described above, two separators 213b are centrally positioned in the electrode assembly 210, the first electrode plates 211p are positioned both above and beneath the two separators 213b, separators 213a are positioned both above and beneath the first electrode plates 211p, and the second electrode plates 212p are positioned both above and beneath the separators 213a.

In addition, the pouch case 230 includes a first region 231 having a cavity 232 and a second region 233 thermally fused to the first region 231. Peripheral regions 232b, corresponding to peripheries of the cavity 232 of the first region 231, and peripheral regions 233b of the second region 233 are thermally fused to each other.

As described above, in the fabrication method of the secondary battery 200 according to the second embodiment of the present invention and the secondary battery 200 fabricated by the fabrication method, the electrically connected first electrode plates 211p and the electrically connected second electrode plates 212p are wound by a winding process. However, after the winding process, the curved portions 213c, 213d, 211d and 212d of the separators 213a and 213b and of the first and second collector plates 211b and 212b are removed altogether, thereby finally completing electrode assembly 210 having a stacked configuration. Therefore, since the completed electrode assembly 210 has no curved portions, fracture of an electrode plate or separation of an active material may not occur. In addition, electrolyte impregnation passages are increased and electrolyte impregnating characteristics can be improved. Moreover, even if the electrode assembly 210 has a stacked configuration, the winding process is employed in manufacturing the electrode assembly 210, thereby demonstrating excellent productivity.

In both embodiments of the present invention, the electrode assembly is wound by a winding process demonstrating high productivity and curved portions are removed, thereby providing a secondary battery having a stacked electrode assembly. Therefore, since the curved portions are removed from the electrode assembly, fracture of an electrode plate or separation of an active material does not occur. In addition, electrolyte impregnation passages of four directions are provided, thereby improving electrolyte impregnating characteristics. Moreover, the winding process is employed, allowing for excellent productivity even for a stacked electrode assembly.

Unlike earlier methods of manufacture and earlier secondary batteries, the present invention cuts off and removes the curved portions of separators and collector plates on both sides of the vertical electrode stack, thereby relieving stress on the electrode plates and separators. By having the curved portions of the separators and collector plates removed, electrolyte impregnation characteristics are improved, and fracture of the electrode plates and separation of the active material thereon will not occur, providing a superior secondary battery.

It is also noted that in the final structures 100 and 200 of the secondary batteries of the first and second embodiments of the present invention, the center thereof has two separator plates arranged directly on each other, with a first electrode plate both immediately below and immediately above the two separator sheets. These first electrode plates at the center of the electrode assembly are negative electrode plates having negative active material thereon. This design is advantageous because negative active material is more reactive than positive active material, and consequently a more efficient electrode assembly is produced by starting with two negative electrode plates at a center thereof. Consequently, the secondary batteries of the present invention produce superior designs to that of earlier secondary batteries.

Although the fabrication method of a secondary battery according to the present invention has been described with reference to the preferred examples, the foregoing disclosure should be interpreted as illustrative only and it should be understood that various modifications and variations can be easily made by those skilled in the art without departing from the spirit of the invention.

<DESCRIPTION OF THE SYMBOLS IN THE DRAWINGS>

| | | | |
|---|---|---|---|
| 100: | Secondary battery according to the present invention | | |
| 110: | Electrode assembly | 111: | first electrode plate arrangement |
| 111p: | First electrode plate | 111a: | First electrode tab |
| 111b: | First current collector plate | 111c: | First active material |
| 112: | Second electrode plate arrangement | 112p | Second electrode plate |
| 112a: | Second electrode tab | | |
| 112b: | Second current collector plate | 112c: | Second active material |
| 113a, 113b: | Separator | 113c, 113d: | Curved portion |
| 121: | First cell tab | 121a: | Insulating tape |
| 122: | Second cell tab | 122a: | Insulating tape |
| 130: | Pouch case | 131: | First region |
| 132: | Cavity | 132a: | Front peripheral region |
| 132b: | Side peripheral region | 133: | Second region |
| 134a: | Metal layer | 134b: | First insulation layer |
| 134c: | Second insulation layer | 310: | Welding tool |
| 320: | Cutting tool | | |

What is claimed is:

1. A method of manufacturing a secondary battery, comprising:
   preparing two separators, a first electrode plate arrangement and a second electrode plate arrangement;
   producing a first arrangement by interposing the first electrode plate arrangement between the two separators;
   producing a second arrangement by attaching the second electrode plate arrangement to an external side of one of the two separators of the first arrangement;
   winding the second arrangement;
   forming a single cell tab for each of the first and second electrode plate arrangements by welding a plurality of electrode tabs together;
   producing an electrode assembly stack by removing curved portions from sides of the wound second arrangement;
   preparing a case;
   placing the electrode assembly stack into the case;
   injecting electrolyte into the case; and
   sealing the case.

2. The method of claim 1, each of the first electrode plate arrangement and the second electrode plate arrangement being comprised of:
- a plurality of discrete collector plates;
- an active region arranged on both sides of each of the collector plates; and
- an electrode tab attached to each collector plate.

3. The method of claim 1, each of the first electrode plate arrangement and the second electrode plate arrangement being comprised of:
- a single collector plate;
- a plurality of discrete active regions arranged on both sides of the collector plate; and
- a plurality of electrode tabs attached to the collector plate at locations corresponding to the respective discrete active regions.

4. The method of claim 3, wherein a spacing between adjacent ones of the discrete active regions increases from one end to another end of the collector plate.

5. The method of claim 1, wherein the removing of the curved portions comprises cutting away curved portions of the separators.

6. The method of claim 3, wherein the removing of the curved portions comprises cutting away curved portions of the collector plates of the first and second electrode plate arrangements as well as cutting away curved portions of the separators.

7. The method of claim 1, wherein the preparing the first and second electrode plate arrangements each comprise:
- providing a plurality of discrete collector plates;
- applying an active material onto both sides of each of the collector plates; and
- attaching an electrode tab to each of the collector plates.

8. The method of claim 1, wherein the preparing the first and second electrode plate arrangements each comprise:
- providing a single collector plate;
- producing a plurality of discrete active regions on the collector plate by applying an active material onto both sides of the collector plate at each active region; and
- attaching a plurality of electrode tabs to the collector plate at locations corresponding to the active regions, wherein a spacing between adjoining ones of the active regions increases in moving from one end to another end along the collector plate.

9. The method of claim 1, wherein in the second arrangement, active regions of the second electrode plate arrangement are aligned with corresponding active regions of the first electrode plate arrangement.

10. The method of claim 1, wherein the curved portions are arranged only on left and right opposing external sides of the wound second arrangement.

11. The method of claim 8, wherein the winding occurs in only one direction selected from a group consisting of a clockwise direction and a counterclockwise direction.

12. The method of claim 6, wherein the removing of the curved portions reduces stress on the first and second electrode plate arrangements and improves electrolyte impregnation characteristics.

13. The method of claim 1, wherein the winding of the second arrangement produces a single vertical stack of first and second active regions and curved portions on opposing sides of the single vertical stack that includes portions of the two separators as well as portions of first and second collector plates corresponding to the first and second electrode plate arrangements.

14. The method of claim 1, wherein the winding of the second arrangement produces a single vertical stack of first and second collector plates having first and second active regions respectively arranged thereon and being aligned with each other and curved portions on opposing sides of the single vertical stack and being comprised only of portions of the separators.

15. The method of claim 1, further comprising folding and attaching wing portions of the case to a body portion of the case.

16. The method of claim 1, the electrode assembly comprises two sheets of one of the two separators arranged directly on top of each other at a center of the electrode assembly.

17. The method of claim 16, wherein a first electrode plate is arranged both directly on top of and directly beneath the two separator sheets.

18. The method of claim 1, the case being a pouch-type case.

* * * * *